US009231673B1

(12) United States Patent
Quinn et al.

(10) Patent No.: US 9,231,673 B1
(45) Date of Patent: Jan. 5, 2016

(54) INFORMATION HANDLING SYSTEM ANTENNA MULTIPLEXED INTERFACE WITH ENHANCED EXTENSIONS

(71) Applicant: Dell Products L.P., Round Rock, TX (US)

(72) Inventors: Liam B. Quinn, Austin, TX (US); Richard W. Schuckle, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/321,004

(22) Filed: Jul. 1, 2014

(51) Int. Cl.
*H04B 7/02* (2006.01)
*H04B 7/04* (2006.01)
*H04W 84/12* (2009.01)

(52) U.S. Cl.
CPC ............ *H04B 7/0413* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,924,031 A * | 7/1999 | Copeland et al. | 455/428 |
| 2009/0121849 A1* | 5/2009 | Whittaker | 340/425.5 |
| 2012/0173787 A1* | 7/2012 | Westwick et al. | 710/313 |
| 2013/0002503 A1* | 1/2013 | Tan | 343/803 |
| 2013/0310109 A1* | 11/2013 | Filipovic et al. | 455/553.1 |
| 2014/0057555 A1* | 2/2014 | Ling | 455/12.1 |

* cited by examiner

*Primary Examiner* — Adolf Dsouza
(74) *Attorney, Agent, or Firm* — Terrile, Cannati, Chambers & Holland, LLP; Robert w. Holland

(57) ABSTRACT

An information handling system adapts to changes in wireless communication protocols and frequencies by modifying a table that defines how wireless networking modules communicate through a wireless controller with antenna modules. In one embodiment, packets are switched between wireless communication modules and antenna modules by reference to an identifier stored in a lookup table of wireless controller. In another embodiment, the wireless controller directs wireless analog signals to between desired wireless networking modules and antenna modules with band pass filters that isolate signals based upon frequency.

6 Claims, 3 Drawing Sheets

INFORMATION HANDLING SYSTEM ANTENNA MULTIPLEXED INTERFACE WITH ENHANCED EXTENSIONS

BACKGROUND OF THE INVENTION

1. Field of the Invention

The present invention relates in general to the field of information handling system wireless communication, and more particularly to an antenna for an information handling system multiplexed interface with enhanced extensions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, and in particular mobile information handling systems, often use wireless networking interfaces to communicate through wireless networks. The wireless networks support a variety of different protocols over a variety of different frequencies and communication ranges. One example of such wireless networks is the wireless wide area networks (WWAN) used by mobile (cellular) telephones, such as 3G and 4G mobile broadband. WWAN networks typically use licensed frequency bands assigned to particular network providers. Another example of such wireless networks is the networks that operate in the unlicensed frequency bands. For instance wireless local area networks (WLAN) use the 2.4 GHz and 5 GHz frequency bands to support shorter range communications typically restricted to a home, office, or retail "hot spot" location. WLAN networks also support peer-to-peer device connectivity for adjacent devices and peripherals. Other unlicensed networks typically used for short range device and peripheral connectivity include Bluetooth and 60 GHz WiGig. Some wireless network devices only receive data, such as GPS and television receivers. Others operate over extremely short ranges, such as near field communication (NFC) devices.

One difficulty faced by information handling system manufacturers is adapting systems to include new wireless devices as such devices become available. For example, future wireless communications systems may include broadband wireless access known as White Space Spectrum, real-time multimedia services, DVB-H/FLO/DMB-T mobile television, 802.20 Flash OFDM and WiMax. Adding additional integrated wireless devices into existing portable information handling systems presents substantial electrical and ID design challenges. Consumers who purchase portable information handling systems generally want the lightest and most streamlined form-factor platforms; however, placing multiple radio and antenna structures in a device typically involves a considerable footprint in order to obtain acceptable performance with each device. Each radio and antenna structure has mechanical constraints for the placement of components, electrical constraints for powering the components and thermal constraints to ensure that the system operates at acceptable temperatures. Radio performance depends upon antenna placement and tuning as well as the material used in the device platform. Further, passing required emissions testing with minimal signal interference and antenna coupling tends to further restrict design alternatives for adding radio and antenna structures. EMI emissions and regulatory compliance varies worldwide, which introduces other design challenges. In addition, end users probably will not desire all possible radio configurations in every system so that different housings may include different structures that introduce difficulties in the manufacture process.

SUMMARY OF THE INVENTION

Therefore a need has arisen for a system and method which multiplexes wireless data sources and wireless transmission sources to re-use radio and antenna structures for wireless communication of information.

In accordance with the present invention, a system and method are provided which substantially reduce the disadvantages and problems associated with previous methods and systems for wireless communication at an information handling system. An information handling system having a wireless controller interfaces with a plurality of wireless networking modules and antenna modules so that multiple wireless protocols and frequencies are supported with interchangeable components. The wireless controller manages changes to an information handling system wireless communication configuration by modifying the transfer of wireless information between wireless communication modules and antenna modules.

More specifically, an information handling system processes information by executing instructions with a processor and memory disposed in a housing, such as a portable laptop or tablet housing. Plural wireless networking modules interface with the processor and memory to manage wireless communications over plural wireless protocols and frequencies. A wireless controller directs signals between desired wireless networking modules and antenna modules, such as by looking up a value included with digital packets or applying a bandpass filter for analog signals having desired frequencies. A wireless management module running on the processor allows modifications to a lookup table referenced by the wireless controller so that added or removed wireless capabilities adapt with existing wireless capabilities. For instance, addition of a wireless network module to the information handling system to provide an additional wireless protocol can leverage an existing antenna module. Increased flexibility in the use of various wireless networking modules and antenna modules allows greater flexibility in manufacture of information handling systems having the same architecture with different wireless capabilities and greater flexibility post-manufacture to adapt an information handling system to desired wireless capabilities with modular hardware updates and a modification to the wireless controller lookup table.

The present invention provides a number of important technical advantages. One example of an important technical advantage is that an information handling system readily adapts to a selection of multiple radio frequency communication devices using multiplexed switching control for management of the analog frequency signals. A lookup table tracks radio modules and antenna structures to support switching of wireless information based upon an information handling system's configuration. For example, the lookup table directs packets between radio modules and antenna structures based upon the transmitted packet type and/or the targeted frequency band for the available mobile transport protocols. Alternatively, band pass filters pull off packets for each analog radio front end. Updates to the lookup table allow ready addition or removal of wireless capabilities and adapting of installed wireless components to changing regional regulatory constraints, such as for specific spectrum and frequency bands based upon location.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A wireless controller coordinates wireless communications at an information handling system through plural wireless frequencies and protocols by leveraging wireless networking modules and antenna modules to adapt to multiple wireless networking tasks. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
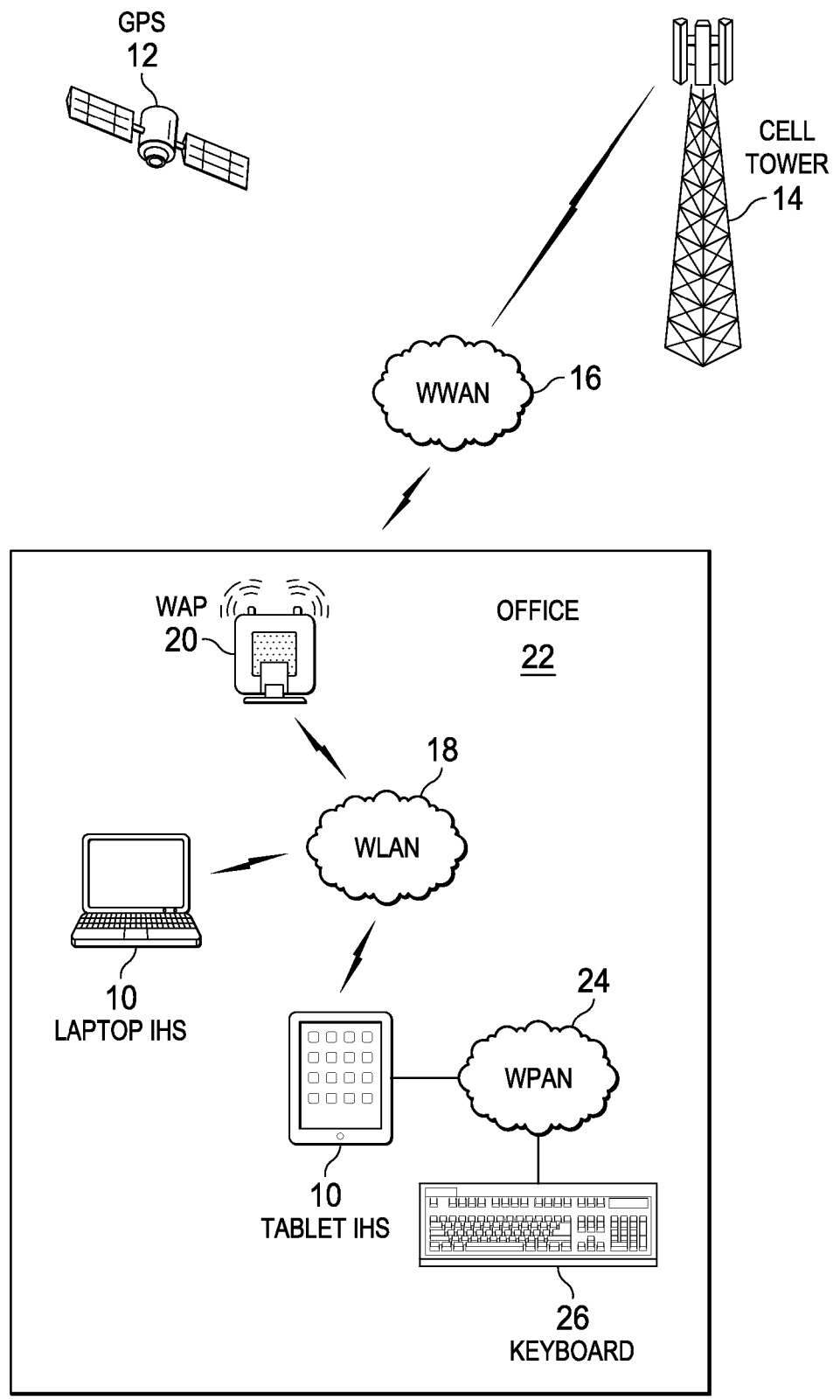
FIG. 1 depicts a block diagram of information handling systems interacting through plural wireless media.

Referring now to FIG. 1, a block diagram depicts information handling systems 10 interacting through plural wireless media. In the example embodiment, one information handling system 10 is depicted with a laptop housing configuration that converts between open and closed positions, and another information handling system 10 is depicted with a tablet housing configuration that has a generally planar housing with an integrated display on one side. Other types of information handling systems 10 may also interact with wireless media, such as smartphones, desktops, servers and various types of convertible information handling systems. In particular, portable information handling systems tend to rely most upon wireless communication media to provide end users with access to information in mobile use cases, however, non-portable systems may also use wireless communication as described herein.

Information handling systems 10 include receiver-only wireless communication systems that only receive wireless signals and transceiver-based wireless communication systems that send and receive wireless information packets. A Global Positioning System satellite 12 is an example of a receiver-only system in which the information handling system 10 receives signals from GPS satellites 12 to determine a position without sending signals out. Generally, information handling system 10 uses a receiver an antenna tuned to a frequency of 1575.42 MHz to receive GPS signals. Transceiver-based wireless communication systems generally use either licensed or public radio frequency spectrums. Licensed spectrums are limited to licensed wireless communication providers who transmit from cell towers 14 in "cells" that provide a wide area of coverage commonly referred to as wireless wide area networks 16 (WWAN). Each wireless communication provider is licensed a defined range of frequencies that its customers use to communicate with cell towers 14. WWANs support voice and data communications that allow end users to communicate with cell towers 14 at ranges of many miles. Public spectrums are unlicensed radio frequencies that are shared by the public. A prominent example of a public spectrum is the 2.4 GHz and 5 GHz frequency bands that are most commonly used to support wireless local area networks 18 (WLAN) that are provided with wireless access points 20 deployed in office buildings 22 or residences. WLANs typically have a relatively short range that limits their use to within a building with ranges in the 100 m distancee. However, due to their relatively high frequency, WLANs offer high information transfer rates with adequate range for most users so that portable information handling systems within range of a WAP 20 generally do not need a wired network connection. Public spectrum is also commonly used to support interaction between information handling systems 10 and peripheral devices in wireless personal area networks (WPANs) 24. For example, a keyboard peripheral 26 interfaces with an information handling system 10 using a Bluetooth connection at 2.4 GHz or an ultra-wideband connection at 60 GHz. The WiGig 60 GHz standard 802.11 ad promises fast wireless communications to support multimedia connectivity for companion devices such as wireless displays.

Figure 2:
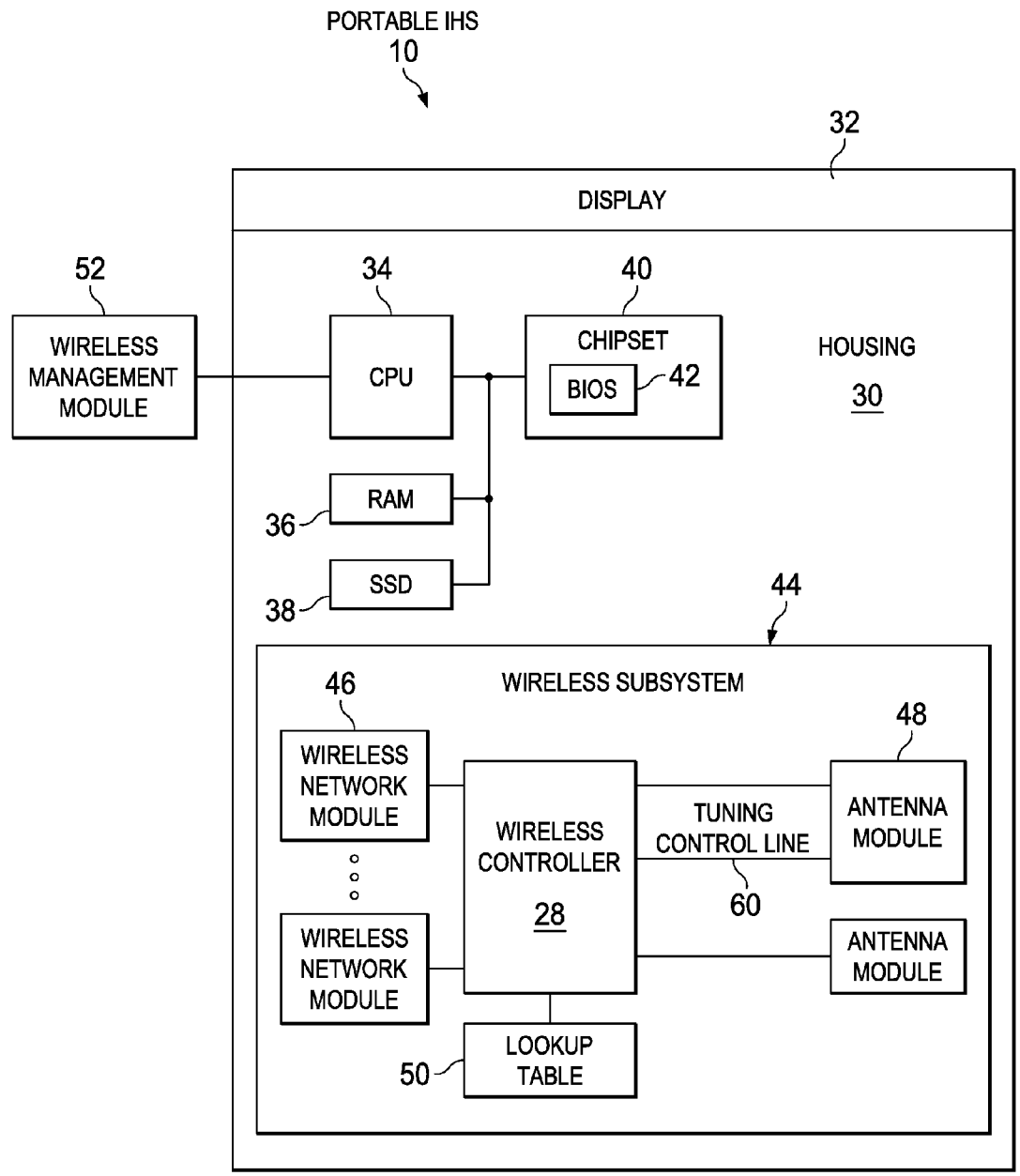
FIG. 2 depicts a block diagram of an information handling system having programmable wireless controller to manage wireless communications through plural wireless protocols and frequencies.

Referring now to FIG. 2, a block diagram depicts an information handling system 10 having a programmable wireless controller 28 to manage wireless communications through plural wireless protocols and frequencies. Information handling system 10 is built in a portable housing 30 that integrates a display 32 and processing components for generating information. For example, a central processing unit (CPU) 34 executes instructions stored in random access memory (RAM) 36 and or persistent memory, such as a solid state drive (SSD) 38 or hard disk drive. A chipset 40 coordinates cooperation between the processing components, such as with BIOS or other firmware instructions. Applications executing on CPU 34 and stored in transitory and non-transitory memory generate information for transmission by wireless media and process information received from wireless media. For example, e-mail and web browsing applications send and receive information through WLANs and WWANs.

A wireless subsystem 44 manages communication of wireless information to and from housing 30 with wireless networking modules 46 that apply appropriate wireless communication protocols. Antenna modules 48 interface with wireless networking modules 46 through wireless controller 28 so that wireless signals that include formatted wireless information are efficiently sent and received with a desired antenna module 48. Wireless controller 28 directs wireless information between desired wireless networking modules 46 and antenna modules 48 based upon settings stored in a lookup table 50. Lookup table 50 supports the configuration of multiple radios operating at information handling system 10 by coordinating the sharing by wireless networking modules 46 of antenna modules 48. For example, each wireless networking module 46 communicates wireless networking information as packets that have an identifier, such as packet header information or a packet tag, that identifies the antenna module 48 to which wireless controller 28 should direct the packets. Similarly, antenna modules 48 include an identifier added to received packets so that wireless controller 28 can direct the packets to an appropriate wireless networking module 46. Wireless networking module 46 looks up identifiers for packets in lookup table 50 to determine the wireless networking module 46 or antenna module 48 associated with the packets. Switch and control logic in wireless controller 28 pairs the correct antenna structures and wireless radios so that radio transmissions take place from correctly tuned antenna. For example, wireless controller 28 is a digital packet switch, a crossbar switch, a multiplexer/demultiplexer, or other device that directs communications between a desired source and target.

In various embodiments, wireless networking modules 46 and antenna modules 48 distribute radio transmission and reception functions in various ways. For example, wireless networking modules 46 might prepare information for transmission in a desired wireless protocol, but send the information in digital form for conversion to an analog signal at antenna modules 48. Alternatively, wireless networking modules 46 might prepare information in a desired wireless protocol and convert the information into a wireless radio signal with a desired frequency that is amplified at antenna modules 48. In such an example embodiment, wireless controller 28 includes band pass filters that isolate desired frequency for communication to desired antenna modules 28. Whether wireless controller 28 manages radio communications as digital or analog signals, the directing of wireless information between wireless networking module 46 and antenna modules 48 is programmable with a wireless management module 52 that programs values in lookup table to direct wireless information in a desired manner. For example, wireless management module 52 executes as part of an operating system and/or BIOS so that information handling system 10 adapts to the addition or removal of wireless networking modules 46 and/or antenna modules 48 as needed to adopt information handling system 10 to a new configuration of wireless communications.

Figure 3:
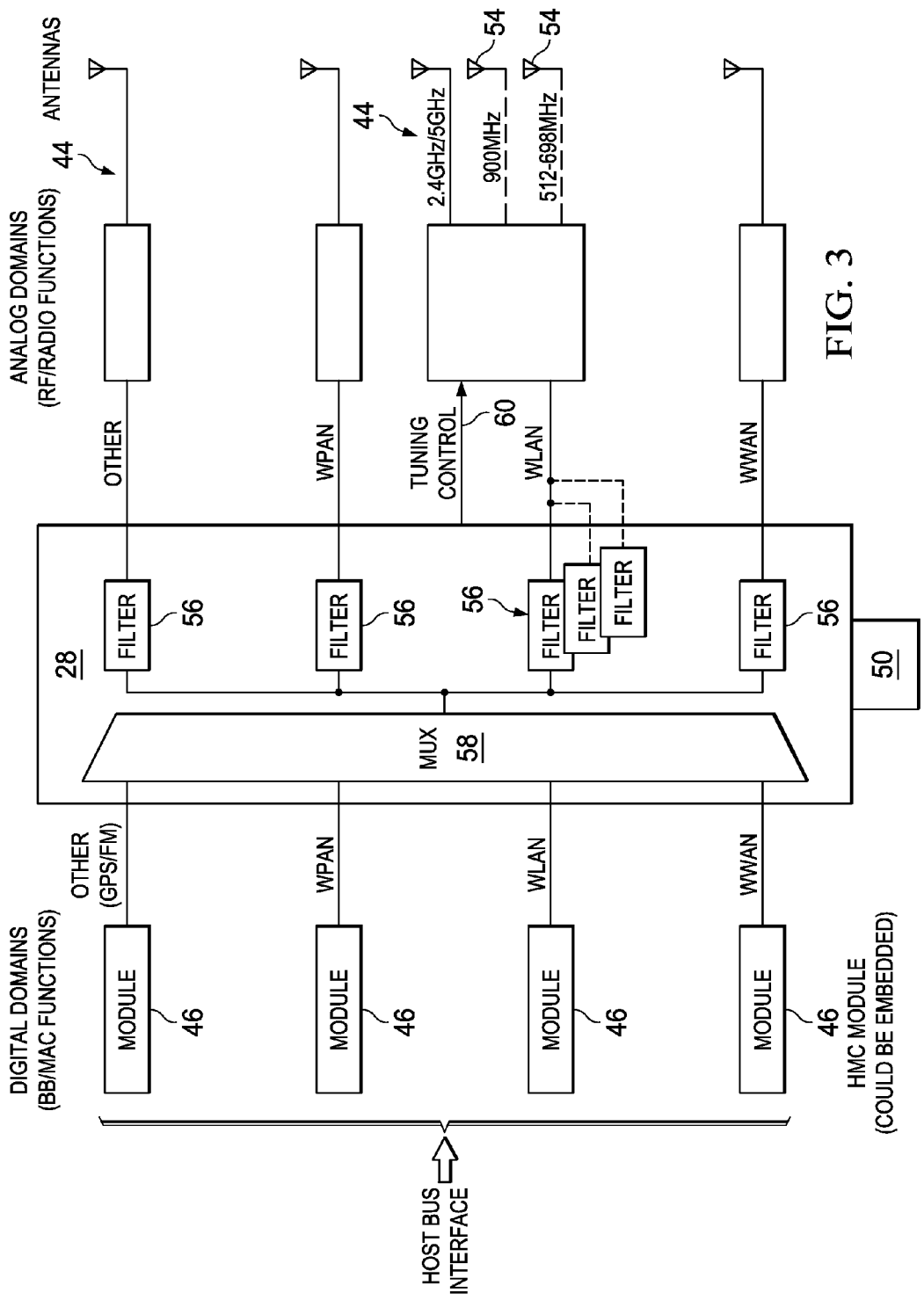
FIG. 3 depicts a circuit diagram of a system having a programmable wireless controller to manage wireless communications through plural wireless protocols and frequencies.

Referring now to FIG. 3, a circuit diagram depicts a system having a programmable wireless controller 28 to manage wireless communications through plural wireless protocols and frequencies. Wireless controller 28 provides for configuration of multiple radios with wireless networking modules 46 and antenna modules 44 configured to interact by setting values stored in a lookup table 50 by having switch and/or control logic pair the right antenna structure with the wireless radio in operation. The challenge addressed by programmable wireless controller 28 is that new frequency bands for added mobile solutions, such as new radio spectrum made available, are comprehended with the addition of a radio and antenna structures to an existing logical control structure. Addressable packets allocate and redirect wireless information to scale for new frequency bands and channels based upon an information handling system's location or region. For example, as new radio spectrum is made available to use for WLAN communications, existing antenna modules 44 are adapted to support the new frequencies, such as 900 MHz. As another example, existing WLAN antenna structures are adapted to support frequencies that perform other functions, such as 512-698 MHz for TV White Space and new spectrum in the 5.858-5.985 MHz frequency bands.

In the example embodiment depicted by FIG. 3, newly deployed spectrum bands planned for WLAN wireless networking modules 46 are added to an existing information handling system wireless networking subsystem by adding antenna elements 54 to an existing antenna module 44 to support 900 MHz and 512-698 MHZ signals. A band pass filter 56 is programmed at wireless controller 28 so that radio signals having the 900 MHz and 512-698 MHz frequencies are passed to the added antenna elements 54. Lookup table 50 is programmed to have values that set band pass filters 56 to have desired frequency characteristics so that desired radio frequency signals pass to and from antenna elements 54. A multiplexer 58 disposed in wireless controller 28 combines all radio frequency signals received from wireless networking modules 46 to a common output for all antenna modules 44 to couple with. In this manner, the processing of information in the digital domains by the wireless networking modules 46 remains unchanged and the management of signals at the analog domains 44 are adapted as necessary to support transmissions and reception in newly added frequencies. Addressable packets in the digital domain are redirected to the analog antenna structure based upon frequency band allocation, similar to the manner used by a PCIe packet switch but implemented in the frequency domain. Antenna structures that support multiple frequencies may further adapt with tuning at the antenna element 54 by the wireless controller 28 based upon the frequencies sensed by the wireless controller or the packet identifiers included with wireless information. For example, an out of band tuning control element 60 is selectively activate by wireless controller 28 as the radio frequencies used by the wireless networking modules 46 shift between radio bands. In this manner, a common antenna element is leveraged to adapt to plural frequency bands used by a wireless network module 46, such as frequency bands added to a WLAN device.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to process information;
a memory disposed in the housing and interfaced with the processor, the memory operable to store the information;
plural wireless networking modules interfaced with the processor and memory, the wireless networking modules operable to process the information input as digital values to support wireless communication by outputting analog signals having the information carried at a selected frequency;

plural antenna modules operable to receive the analog signals and send or receive the information as wireless signals; and a wireless controller interfaced with the plural wireless networking modules and the plural antenna modules, the wireless controller operable to direct information between predetermined of the wireless network modules and predetermined of the antenna modules, the wireless controller receiving the information from the plural wireless networking modules as analog signals and directing the analog signals to desired of the plural antenna modules by setting a band pass filter frequency at each of the plural antenna modules to allow the desired analog signal to pass to the desired antenna module;

a lookup table interfaced with the wireless controller and storing an association of predetermined of the wireless network modules and predetermined of the antenna modules;

wherein the wireless controller applies the association to direct information between predetermined of the wireless networking modules and predetermined of the antenna modules; and wherein the wireless controller applies the association of the lookup table by setting a band pass filter to direct information based upon a transmission frequency of the information.

2. The system of claim 1 wherein the lookup table further stores one or more antenna settings to tune one or more antennae, and the controller applies the one or more antenna settings based upon the predetermined of the wireless networking modules associated with the information.

3. The system of claim 1 further comprising a wireless management module stored in the memory and operable to execute on the processor to alter the lookup table to adapt to varying configurations of wireless networking modules or antenna modules.

4. The system of claim 1 wherein the wireless controller comprises a crossbar switch.

5. The system of claim 1 wherein the wireless controller comprises a multiplexer/demultiplexer.

6. The system of claim 5 wherein the wireless modules comprise at least a GPS receiver, a wireless local area network transceiver, and a personal area network transceiver.

* * * * *